United States Patent
Hsieh et al.

(10) Patent No.: US 12,449,347 B2
(45) Date of Patent: Oct. 21, 2025

(54) MECHANICAL MEMBER OF DETECTING ADHESION STRENGTH

(71) Applicant: QISDA CORPORATION, Taoyuan (TW)

(72) Inventors: Yung-Tsun Hsieh, New Taipei (TW); Pin-Xue Li, Tainan (TW)

(73) Assignee: Qisda Corporation, Taoyuan (TW)

( * ) Notice: Subject to any disclaimer, the term of this patent is extended or adjusted under 35 U.S.C. 154(b) by 690 days.

(21) Appl. No.: 17/731,252

(22) Filed: Apr. 27, 2022

(65) Prior Publication Data

US 2023/0273114 A1    Aug. 31, 2023

(30) Foreign Application Priority Data

Feb. 25, 2022    (CN) .......................... 202210176902.5

(51) Int. Cl.
*G01N 19/04* (2006.01)
*G01N 3/04* (2006.01)

(52) U.S. Cl.
CPC ............... *G01N 19/04* (2013.01); *G01N 3/04* (2013.01)

(58) Field of Classification Search
CPC ..................................................... G01N 19/04
USPC ....................................................... 73/150 A
See application file for complete search history.

(56) References Cited

U.S. PATENT DOCUMENTS

| | | | |
|---|---|---|---|
| 2008/0011075 A1* | 1/2008 | Menendez Martin | G01N 19/04 73/150 A |
| 2013/0265765 A1* | 10/2013 | Liang | H05K 5/0208 362/249.02 |
| 2021/0372896 A1* | 12/2021 | Ertl | G01N 3/08 |

* cited by examiner

*Primary Examiner* — Walter L Lindsay, Jr.
*Assistant Examiner* — Philip T Fadul

(57) ABSTRACT

A mechanical member of detecting adhesion strength is assembled with a housing. The mechanical member includes a main structural portion, a bridging portion and an inspection portion. The main structural portion is adhered to the housing. The bridging portion is connected to the main structural portion and has a cuttable property. The inspection portion is connected to a position of the bridging portion different from the main structural portion, and is adhered to the housing. The inspection portion is pulled or pushed by an external force when the bridging portion is cut off, so as to evaluate adhesion strength between the main structural portion and the housing according to a separation degree between the inspection portion and the housing.

14 Claims, 10 Drawing Sheets

MECHANICAL MEMBER OF DETECTING ADHESION STRENGTH

BACKGROUND OF THE INVENTION

1. Field of the Invention

The present invention relates to a mechanical member of detecting adhesion strength, and more particularly, to a mechanical member of protecting a main structural portion and effectively detecting the adhesion strength.

2. Description of the Prior Art

With the advanced technology, the consumer electronic product, such as the tablet computer and the smart phone, are often designed with a combination of different materials to meet specific appearance and functional requirements. The conventional dissimilar material bonding technology attaches a metal case to a plastic mold via the glue. The adhesion strength provided by the glue is affected by process parameters, such as the heating temperature, the material temperature, the ambient temperature, the pressing period, the heating period, the pressing force and the storage environment. Sampling inspection and destructive test of the tension or the pressure are used to check the adhesion strength between the dissimilar materials in the mass-produced electronic product. The sampled electronic products are discarded due to structural damage after the destructive test. If the electronic product is expensive, a sampling quantity of the electronic product is insufficient for saving costs; thus, detects of the mass-produced electronic product cannot be effectively found, and therefore market competition of the electronic product is downgraded.

SUMMARY OF THE INVENTION

The present invention provides a mechanical member of protecting a main structural portion and effectively detecting the adhesion strength for solving above drawbacks.

According to the claimed invention, a mechanical member of testing adhesion strength is assembled with a housing. The mechanical member includes a main structural portion, a bridging portion and an inspection portion. The main structural portion is attached to the housing. The bridging portion is connected to the main structural portion and has a cuttable property. The inspection portion is connected to a position of the bridging portion different from the main structural portion, and is attached to the housing. The inspection portion is pulled or pushed by an external force when the bridging portion is cut off, so as to evaluate adhesion strength between the main structural portion and the housing according to a separation degree between the inspection portion and the housing.

According to the claimed invention, the bridging portion includes a first end and a second end opposite to each other. The first end and the second end are respectively connected to the main structural portion and the inspection portion. The bridging portion is cut off at an area between the first end and the second end, or at an area between the first end and the main structural portion, or at an area between the second end and the inspection portion. The mechanical member is made by plastic material. The housing is a case of an electronic device made by metal material or fiberglass material. The main structural portion, the bridging portion and the inspection portion of the mechanical member are monolithically integrated in an injection molding manner.

The mechanical member of the present invention can dispose the inspection portion adjacent to the main structural portion, and the inspection portion is applied for the destructive test to protect the initial function of the main structural portion. For decreasing manufacturing cost of the mechanical member, the present invention can connect the bridging portion between the main structural portion and the inspection portion, and manufacture the main structural portion, the bridging portion and the inspection portion of the mechanical member in the same injection molding manner, and then attach the main structural portion and the inspection portion to the housing in the same adhesive manner. When the mechanical member is attached to the housing, the destructive test for the inspection portion can be executed by cutting off the bridging portion to break down connection between the main structural portion and the inspection portion. Because the main structural portion and the inspection portion can have the same adhesion strength relative to the housing, the testing result of the inspection portion can be used to evaluate whether the adhesion strength of the main structural portion conforms to a predefined condition, and completeness of the main structural portion can be stilled maintained without discarding the mechanical member.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
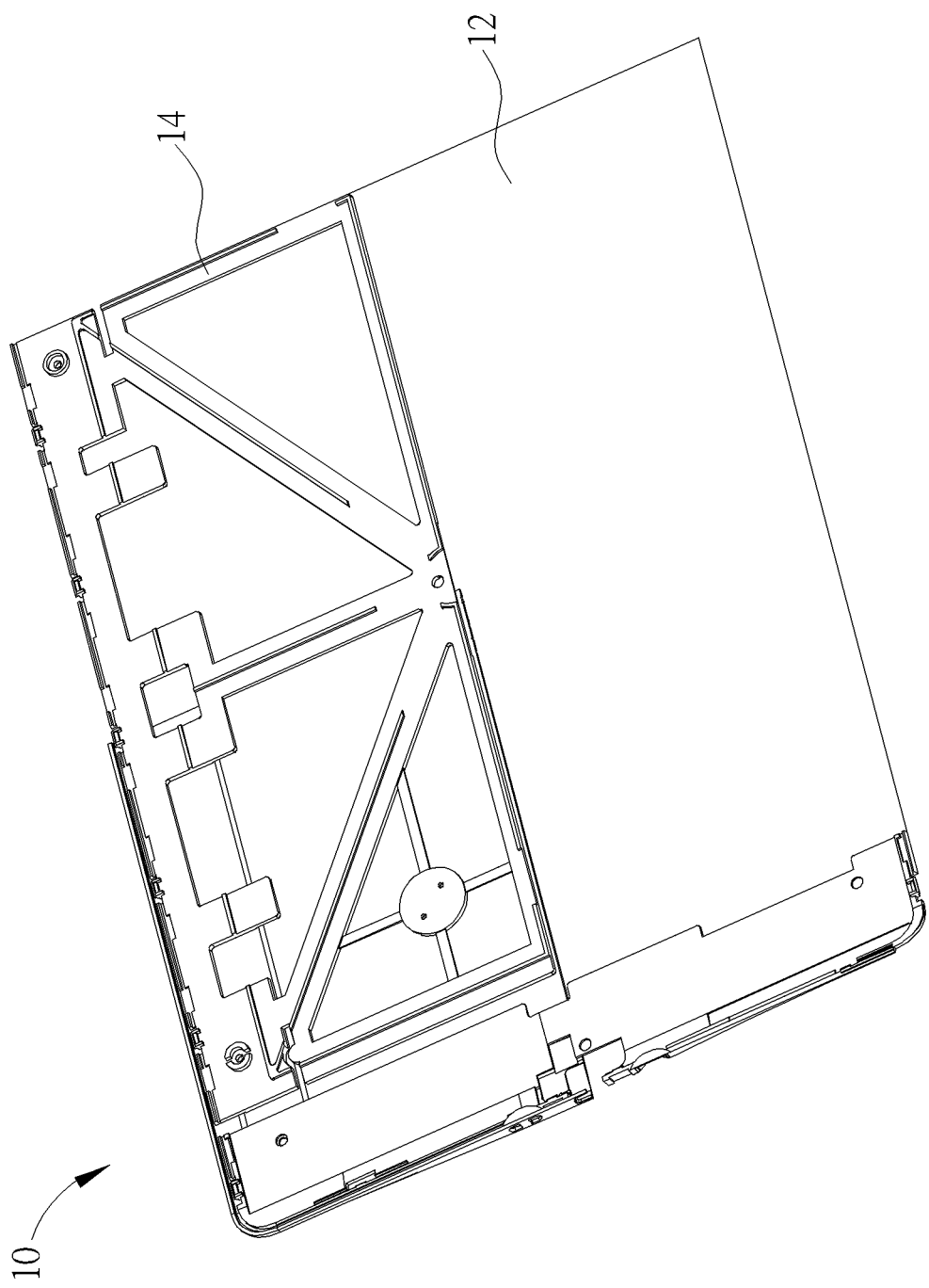
FIG. 1 is a diagram of a part of an electronic device according to an embodiment of the present invention.
Figure 2:
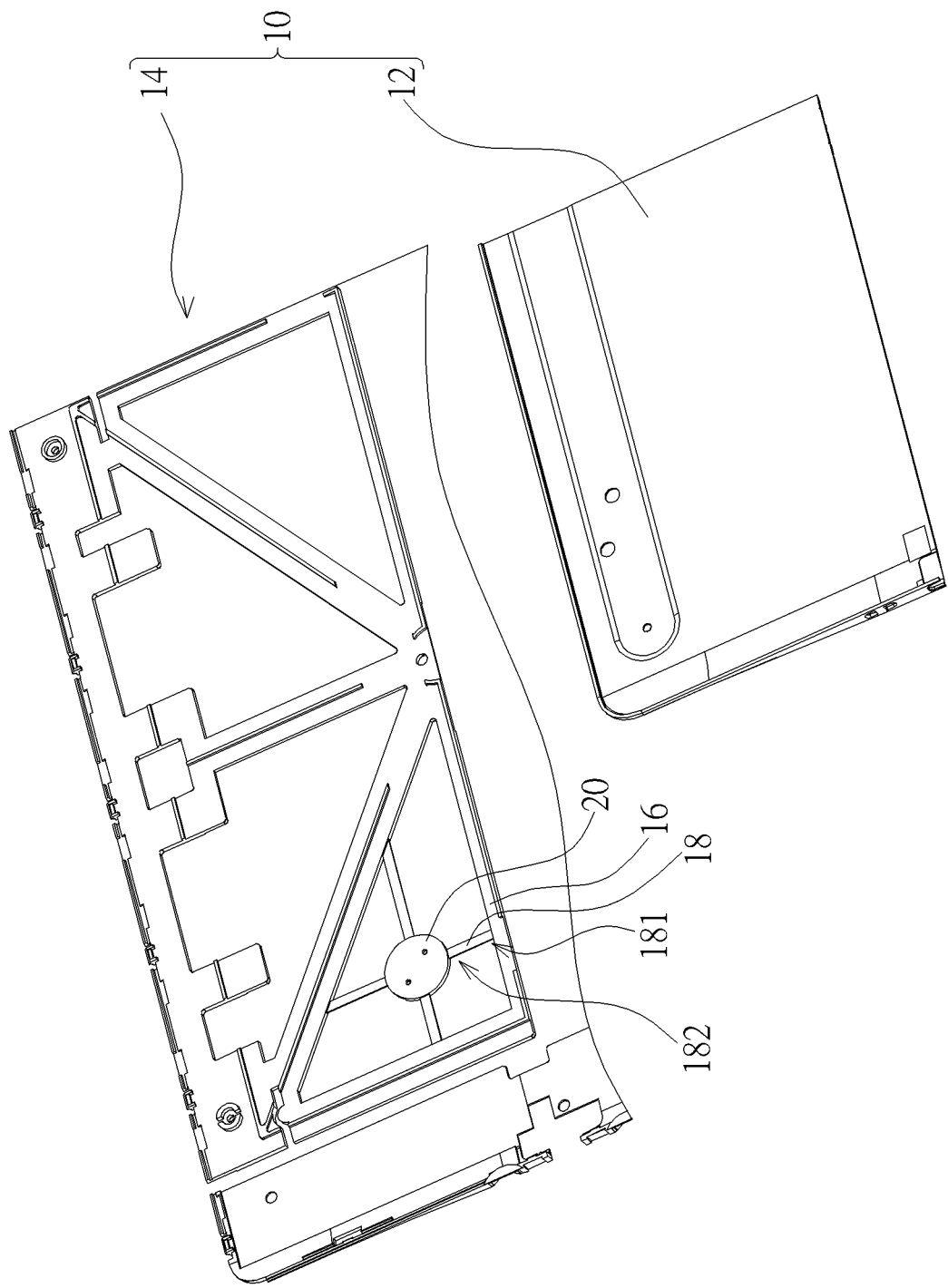
FIG. 2 is an exploded diagram of the electronic device according to the embodiment of the present invention.

Please refer to FIG. 1 and FIG. 2. FIG. 1 is a diagram of a part of an electronic device 10 according to an embodiment of the present invention. FIG. 2 is an exploded diagram of the electronic device 10 according to the embodiment of the present invention. The electronic device 10 can include a housing 12 and a mechanical member 14. The electronic device 10 can be a computer with thin type design, such as the tablet computer or the graphics tablet. An actual application of the electronic device 10 is not limited to the foresaid embodiment. The housing 12 can be a case made by metal material or fiberglass material. The mechanical member 14 can be made by plastic material or aluminum die cast alloys, or any material used for injection molding process or monolithic integrated process. The mechanical member 14 can be assembled inside the housing 12 for being a base of other electronic components of the electronic device 10. Generally, the housing 12 and the mechanical member 14 are made by different material, and the mechanical member 14 is attached to the housing 12 via glue. The special design of the present invention can be used to test adhesion strength between the housing 12 and the mechanical member 14 for preventing an initial function of the mechanical member 14 from damage by destructive testing. However, the mechanical member 14 and the housing 12 may be optionally made by the same material, such as the plastic or the metal, or other similar material.

The mechanical member 14 can include a main structural portion 16, a bridging portion 18 and an inspection portion 20. The main structural portion 16 can be attached to the housing 12 via the glue. The bridging portion 18 can be connected between the main structural portion 16 and the inspection portion 20, and can have a cuttable property. The bridging portion 18 may be pulled apart, or be cut off by a knife or a scissor, which depends on an actual demand. The inspection portion 20 can be connected to a position of the bridging portion 18 different from the main structural portion 16, and may be optionally attached to the housing 12. For testing the adhesion strength between the housing 12 and the mechanical member 14, the bridging portion 18 can be cut off and then the inspection portion 20 can be pulled or pushed via an external force with specific strength. The main structural portion 16 and the inspection portion 20 can be made by the same or similar material, and be attached to the housing 12 via the same glue; therefore, the adhesion strength between the main structural portion 16 and the housing 12 can be accurately evaluated in accordance with a separation degree between the inspection portion 20 and the housing 12 on the premise that the main structural portion 16 is not separated from the housing 12.

It should be mentioned that the main structural portion 16 and the inspection portion 20 are made by the same material and are attached to the housing 12 in the same adhesive manner, which means the main structural portion 16 and the inspection portion 20 can have the same molding parameters and the same adhered parameters; the bridging portion 18 can be attached to the housing 12 in the same adhesive manner, or may contact against the housing 12 in the incoherent manner, or may be space from and suspended above the housing 12. If the main structural portion 16, the bridging portion 18 and the inspection portion 20 are made by the same molding parameters and attached to the housing 12 via the same adhered parameters, the bridging portion 18 can be applied to analogize the adhesion strength of the main structural portion 16. Assembly of the bridging portion 18 and the housing 12 does not affect the adhesion strength testing result of the mechanical member 14, and is not limited to the foresaid coherent manner and the incoherent manner, or a contacting manner and a non-contacting manner, which depends on the design demand.

The inspection portion 20 is forced for testing after the bridging portion 18 is cut off, so that the main structural portion 16 and the inspection portion 20 are preferably disposed on different positions on the bridging portion 18, to prevent the adhesion strength between the main structural portion 16 and the housing 12 from damage due to the main structural portion 16 being pulled when the external force is applied to the inspection portion 20. For example, the bridging portion 18 can have a first end 181 and a second end 182 opposite to each other and respectively connected to the main structural portion 16 and the inspection portion 20. The present invention can cut of an area between the first end 181 and the second end 182, or cut off an area between the first end 181 and the main structural portion 16, or cut off an area between the second end 182 and the inspection portion 20. Position of the main structural portion 16 and the inspection portion 20 relative to the bridging portion 18 is not limited to the foresaid embodiments, and depends on the design demand.

The foresaid separation degree can be interpreted as noting whether the inspection portion 20 is separated from the housing 12 because of adhesion between the inspection portion 20 and the housing 12 being damaged when the external force with first strength is applied to pull the inspection portion 20. If the adhesion is not damaged, the adhesion strength is greater than the external force with the first strength, and another external force with second strength can be applied to pull the inspection portion 20, and the inspection portion 20 can be noted to determine whether the inspection portion 20 is separated from the housing 12 due to the damaged adhesion. The external force can be gradually enlarged until the external force is greater than the adhesion strength to separate the inspection portion 20 from the housing 12, and then the maximal adhesion strength of the mechanical member 14 can be decided. Besides, the separation degree may indicate that the inspection portion 20 is completely or partly separated from the housing 12, which depends on the design demand and the detailed description is omitted herein for simplicity.

Figure 3:
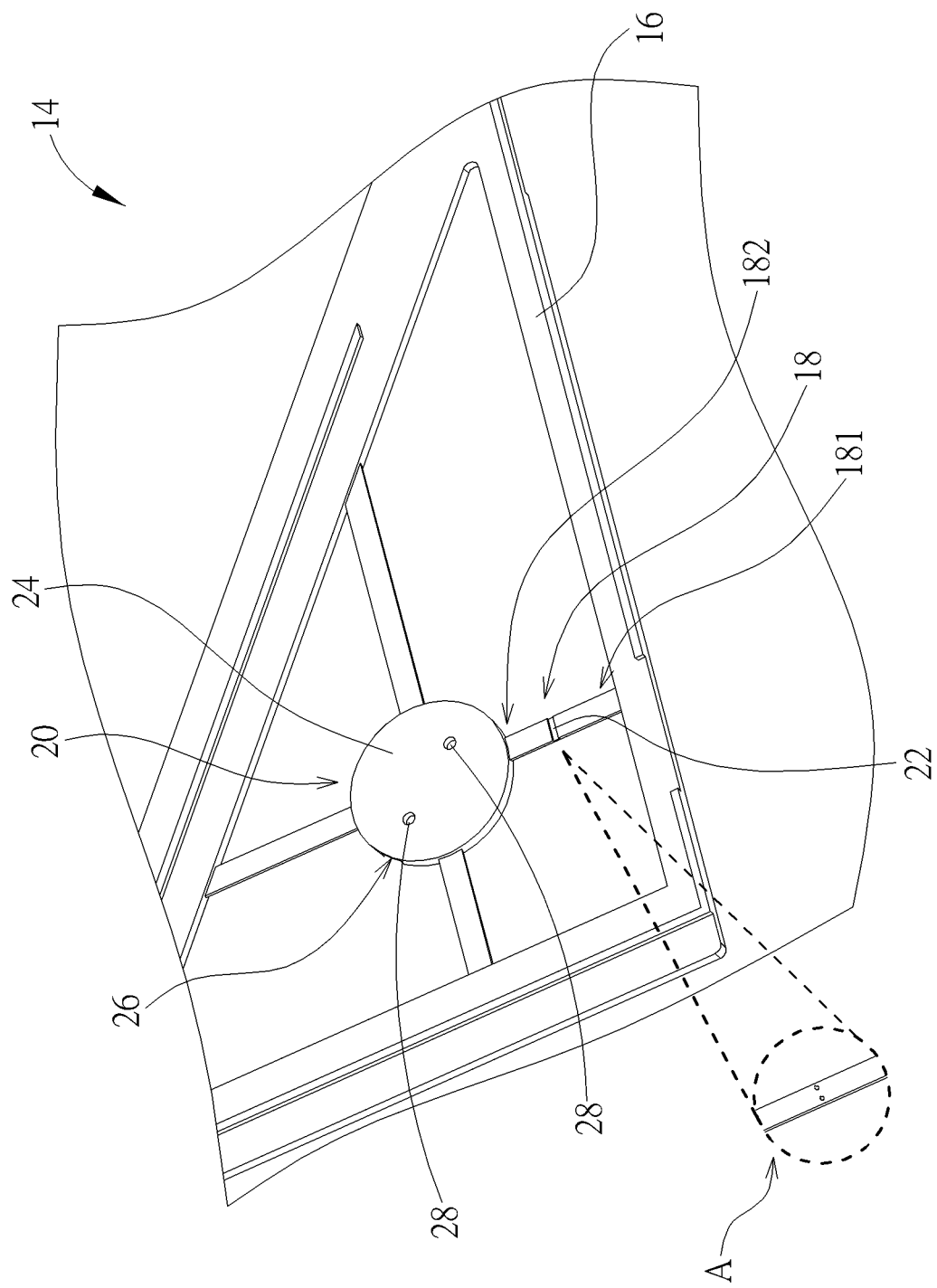
FIG. 3 and FIG. 4 are enlarged diagrams of the mechanical member in different views according to a first embodiment of the present invention.
Figure 4:
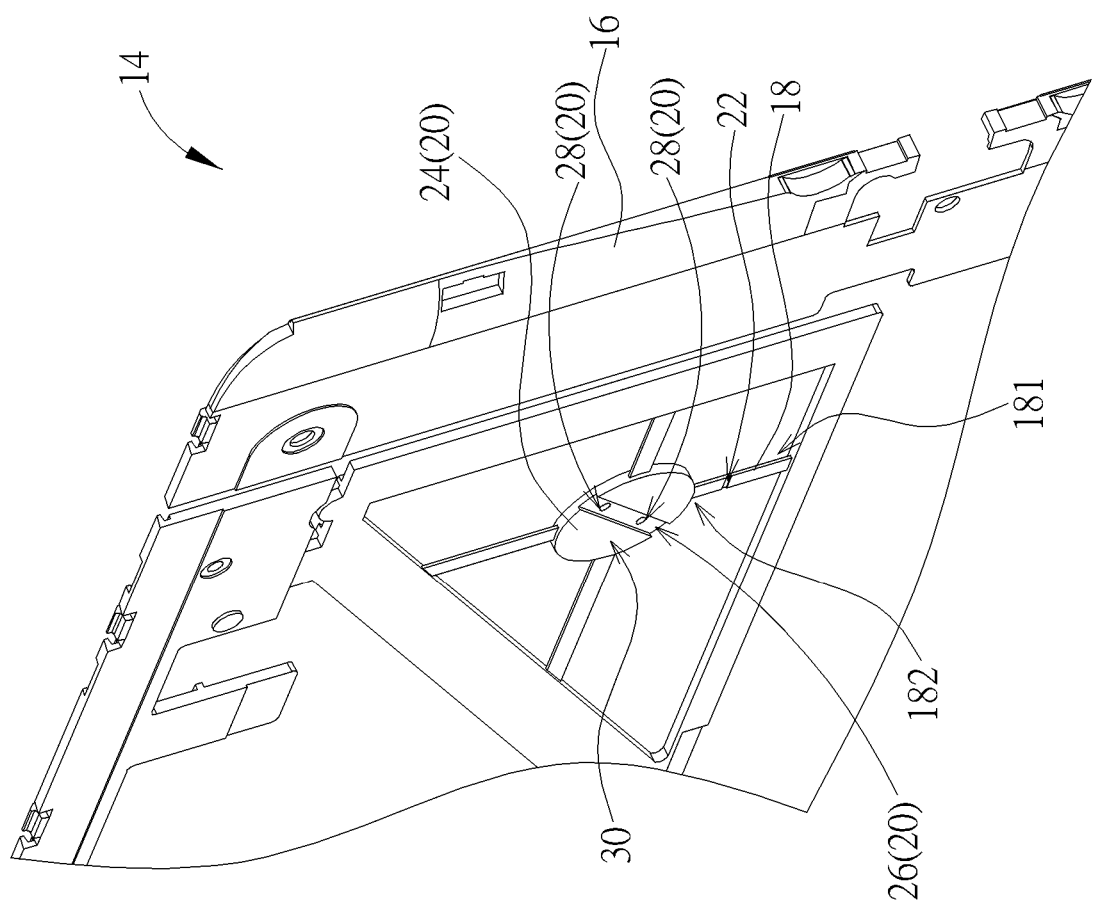

Please refer to FIG. 3 and FIG. 4. FIG. 3 and FIG. 4 are enlarged diagrams of the mechanical member 14 in different views according to a first embodiment of the present invention. The mechanical member 14 can provide several convenient design, which have the bridging portion 18 being easily cut off and the inspection portion 20 being pulled in different conditions, so as to ensure the main structural portion 16 is stably attached to the housing 12. The bridging portion 18 can have a notch 22 used to weaken structural strength of the bridging portion 18 for easy cut-off. The notch 22 may be located on a middle section of the bridging portion 18, or on one section close to the first end 182, or on another section close to the second end 182. A shape, a length and a depth of the notch 22 are not limited to the embodiment shown in the present invention. The notch 22 can be a slot, or a concave, or a hole. As shown in FIG. 3, the notch 22 on the bridging portion 18 is a striped slot; further, as an embodiment shown in the area A of FIG. 3, the notch 22 may be the concave that is slightly sunken, or the hole piercing through a main body of the bridging portion 18.

Besides, the inspection portion 20 can mainly include a plate structure 24, a long ditch 26 and a piercing hole 28. A bottom surface 30 of the plate structure 24 can be attached to the housing 12. The long ditch 26 can be formed on the bottom surface 30 of the plate structure 24, and used to test a condition that the inspection portion 20 is prized by an external component (such as a solid component made by the plastic material or the metal material). The external component can be inserted into the long ditch 26 to push the inspection portion 20 upwardly for testing. The piercing hole 28 can be formed on a position of the plate structure 24 correspond to the long ditch 26; the external component (such as a soft component made by the fabric) can pass through the piercing hole 28 and be pulled upwardly. A depth and a width of the long ditch 26, and a radius and a number of the piercing hole 28 are not limited to the embodiment shown in the figures.

Figure 5:
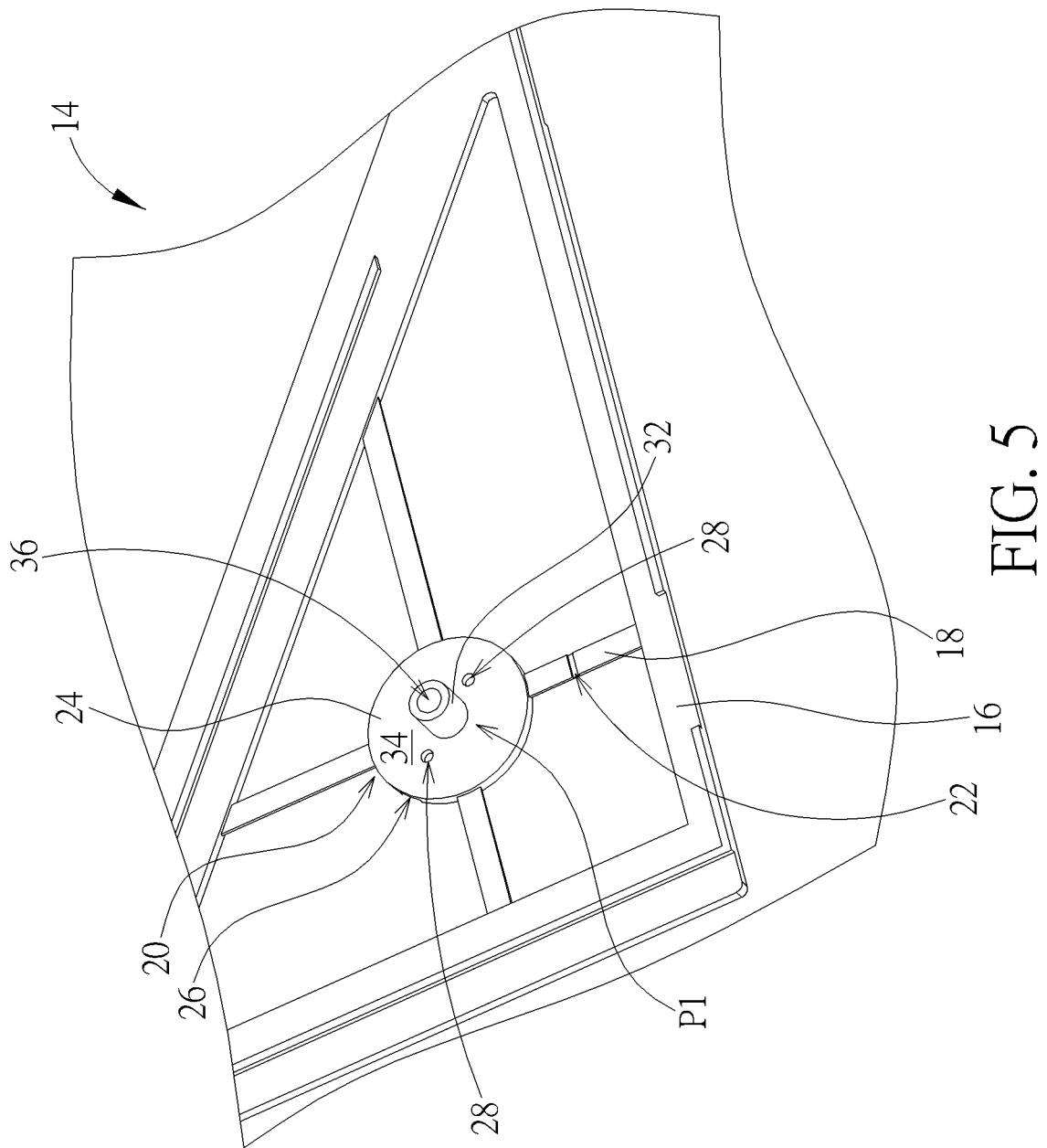
FIG. 5 is an enlarged diagram of the mechanical member according to a second embodiment of the present invention.
Figure 6:
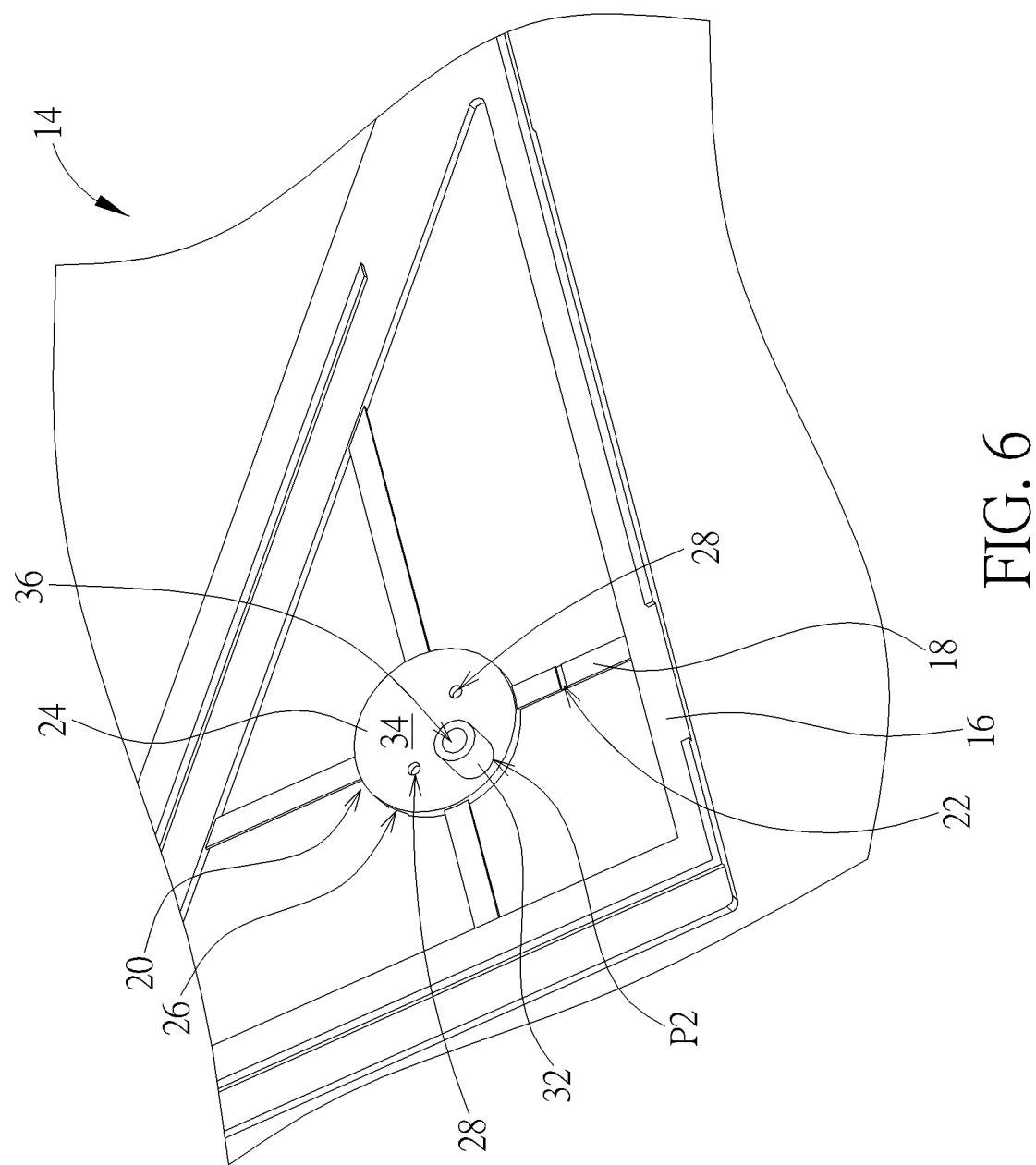
FIG. 6 is a diagram of the mechanical member in another type according to the second embodiment of the present invention.

Please refer to FIG. 5 and FIG. 6. FIG. 5 is an enlarged diagram of the mechanical member 14 according to a second embodiment of the present invention. FIG. 6 is a diagram of the mechanical member 14 in another type according to the second embodiment of the present invention. In the second embodiment, elements having the same numerals as ones of the first embodiment have the same structures and functions, and the detailed description is omitted herein for simplicity. The inspection portion 20 of the mechanical member 14 can further include a locking unit 32 disposed on a top surface 34 of the plate structure 24. The locking unit 32 can have a sunken area 36 used to hold the external component for bearing the external force. For example, the external component can be a bolt, a pin or any bar. The external component can be inserted into the sunken area 36 and pressed laterally, and used to test whether the inspection portion 20 is prized. Features and parameters of the locking unit 32 and the sunken area 36 are not limited to the embodiments shown in the figures.

As shown in FIG. 5, the locking unit 32 can be disposed on a central area P1 of the top surface 34, and used to test the adhesion strength on the center of the whole inspection portion 20. Moreover, as shown in FIG. 6, the locking unit 32 can be optionally disposed on an edge area P2 of the top surface 34, and used to test the adhesion strength on an edge of the inspection portion 20. The present invention may dispose one or several locking units 32 respectively on the central area P1 and the edge area P2 of the top surface 34. Variation of the locking units 32 can depend on the actual demand.

Figure 7:
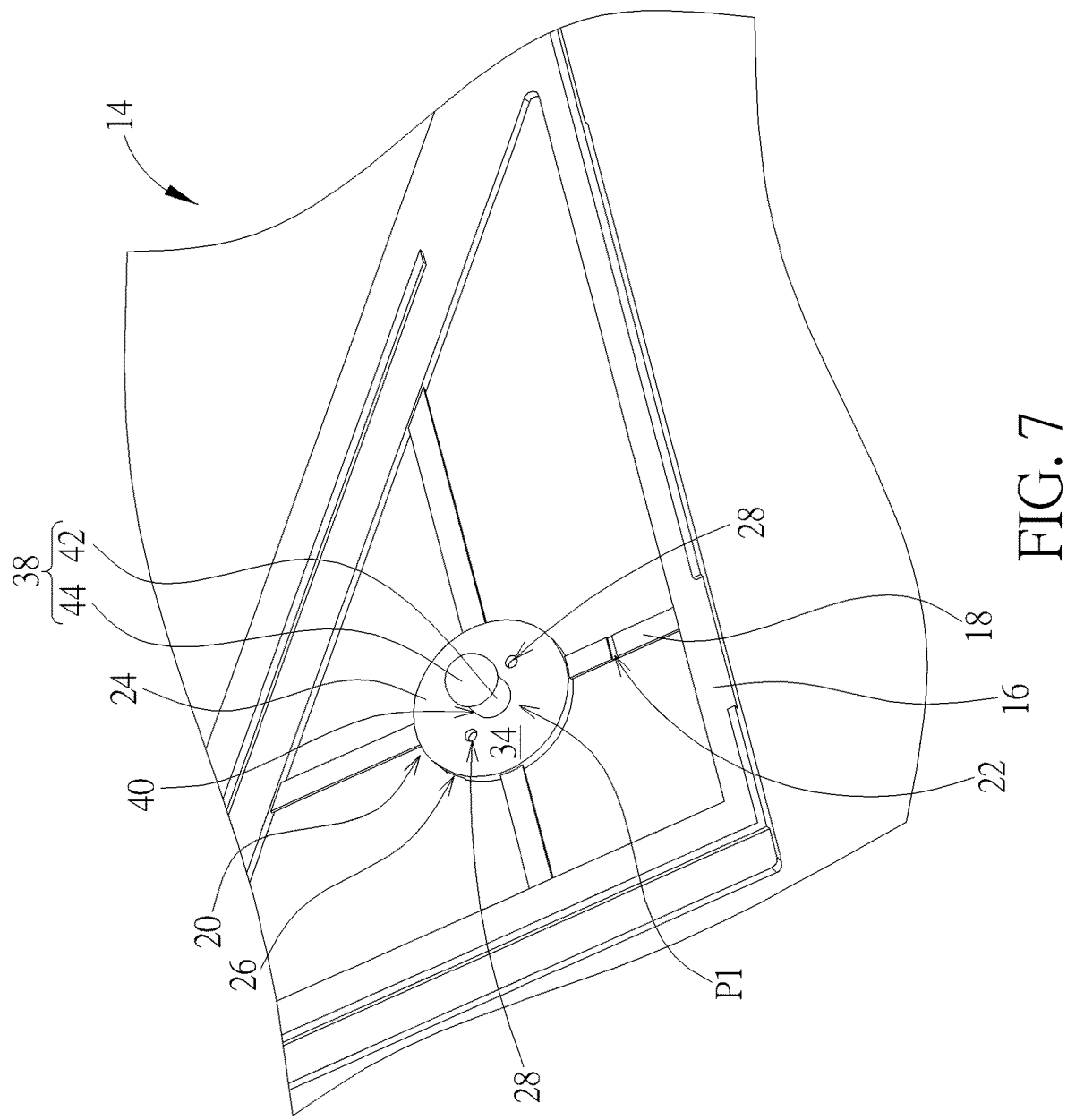
FIG. 7 is an enlarged diagram of the mechanical member according to a third embodiment of the present invention.
Figure 8:
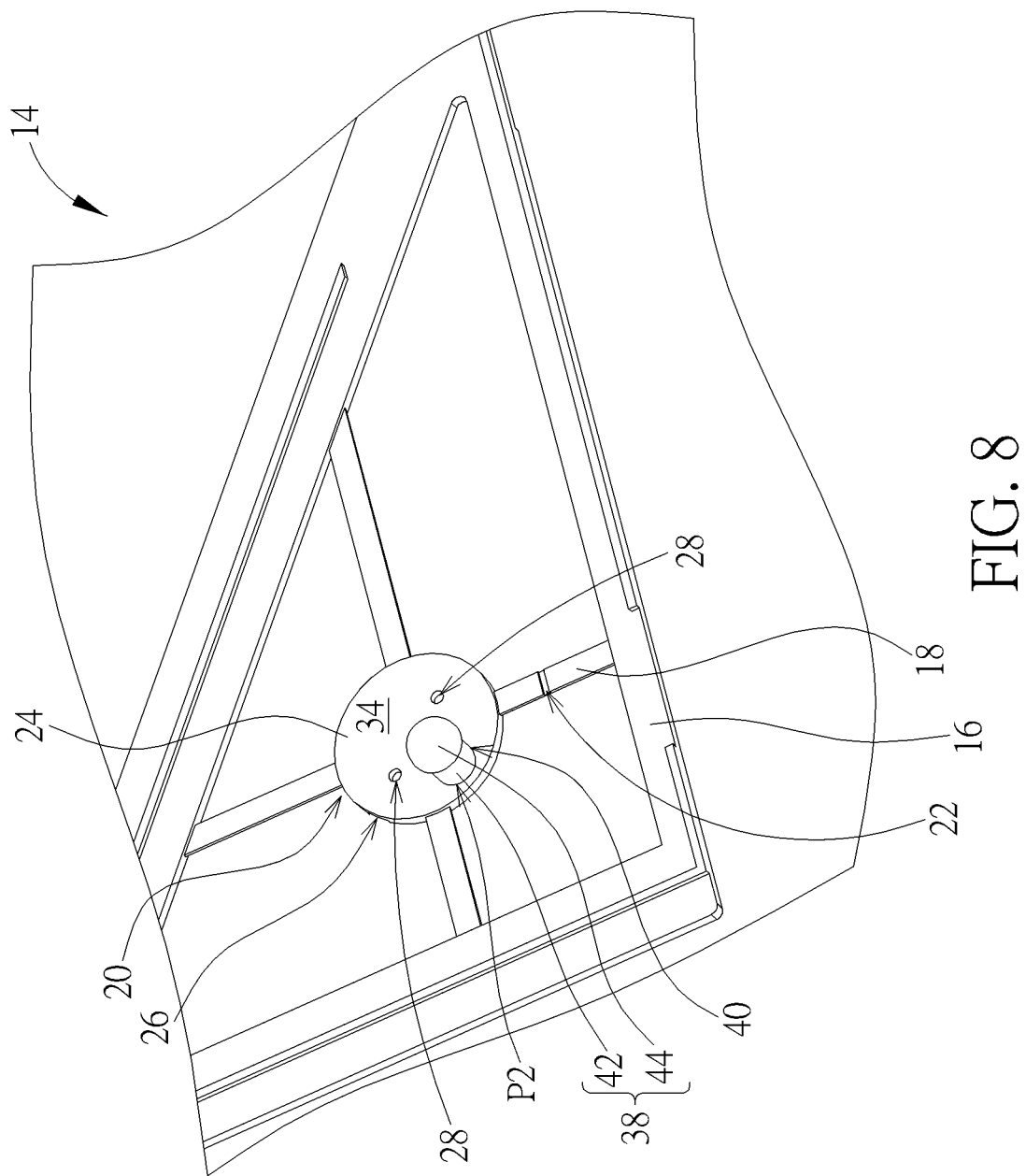
FIG. 8 is a diagram of the mechanical member in another type according to the third embodiment of the present invention.

Please refer to FIG. 7 and FIG. 8. FIG. 7 is an enlarged diagram of the mechanical member 14 according to a third embodiment of the present invention. FIG. 8 is a diagram of the mechanical member 14 in another type according to the third embodiment of the present invention. In the third embodiment, elements having the same numerals as ones of the foresaid embodiments have the same structures and functions, and the detailed description is omitted herein for simplicity. The inspection portion 20 of the mechanical member 14 can further include a bucking unit 38 disposed on the top surface 34 of the plate structure 24. An outer surface 40 of the bucking unit 38 can be connected to the external component for bearing the external force. The bucking unit 38 can include a first region 42 and a second region 44. The first region 42 can be disposed on the top surface 34. The second region 44 can be disposed on an end of the first region 42 opposite to the top surface 34. A radial dimension of the second region 44 can be greater than a radial dimension of the first region 42. If the external component is rope, the outer surface 40 can be wound by the rope, and the rope can be constrained on the bucking unit 38 due to step difference between the first region 42 and the second region 44 for outwardly pulling and foresaid testing.

As shown in FIG. 7, the bucking unit 38 can be disposed on the central area P1 of the top surface 34, and used to test the adhesion strength on the center of the whole inspection portion 20. Moreover, as shown in FIG. 8, the bucking unit 38 can be optionally disposed on the edge area P2 of the top surface 34, and used to test the adhesion strength on the edge of the inspection portion 20. The present invention may dispose one or several bucking unit 38 respectively on the central area P1 and the edge area P2 of the top surface 34. Variation of the bucking unit 38 can depend on the actual demand.

Figure 9:
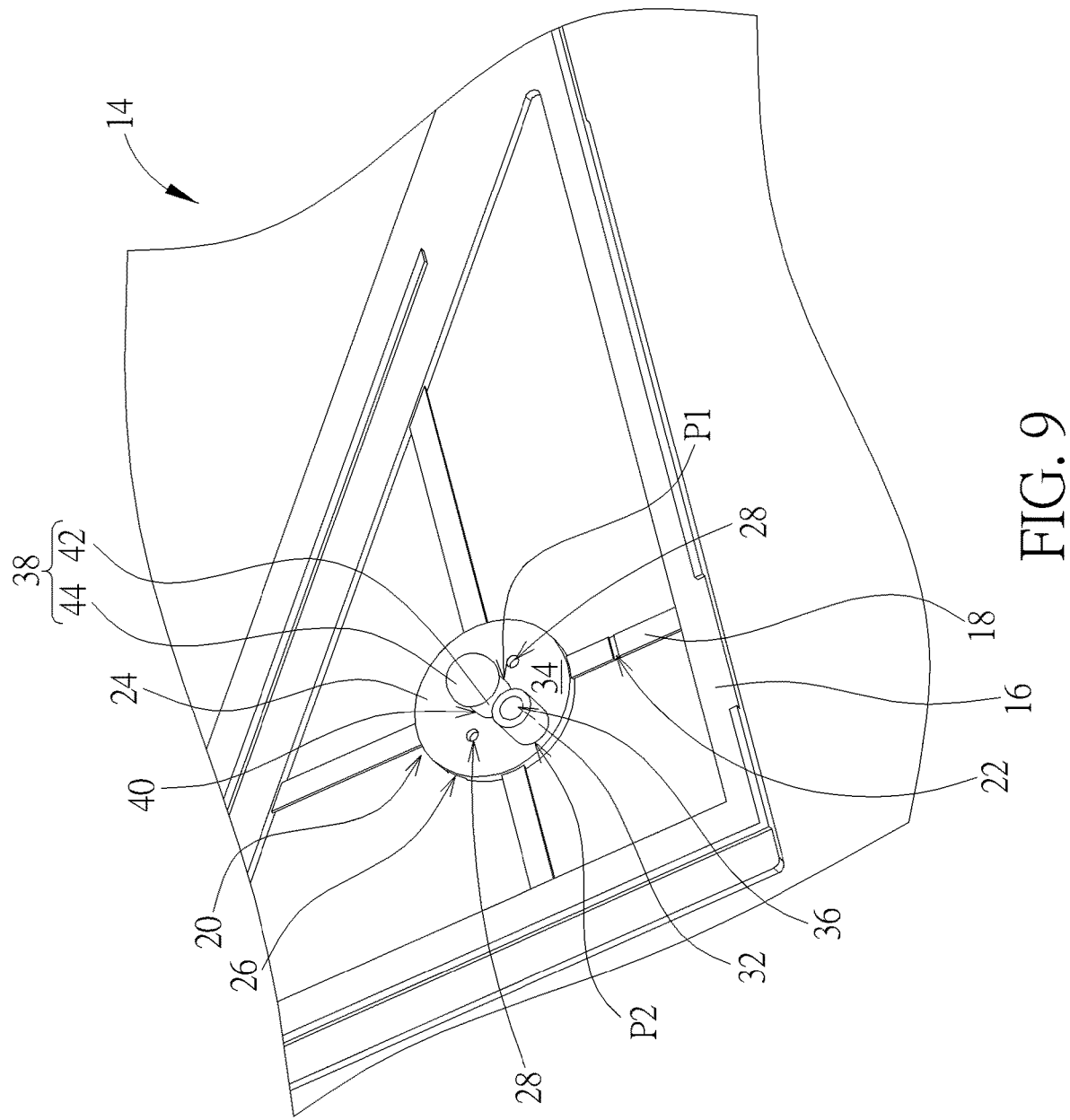
FIG. 9 is an enlarged diagram of the mechanical member according to a fourth embodiment of the present invention.

Please refer to FIG. 9. FIG. 9 is an enlarged diagram of the mechanical member 14 according to a fourth embodiment of the present invention. In the fourth embodiment, elements having the same numerals as ones of the foresaid embodiments have the same structures and functions, and the detailed description is omitted herein for simplicity. The inspection portion 20 of the fourth embodiment can dispose the locking unit 32 and the bucking unit 38 respectively on different positions on the top surface 34 of the plate structure 24. As the embodiment shown in FIG. 9, the locking unit 32 can be disposed on the edge area P2 of the top surface 34, and the bucking unit 38 can be disposed on the central area P1 of the top surface 34. An actual application of the locking unit 32 and the bucking unit 38 is not limited to the above-mentioned embodiment.

Figure 10:
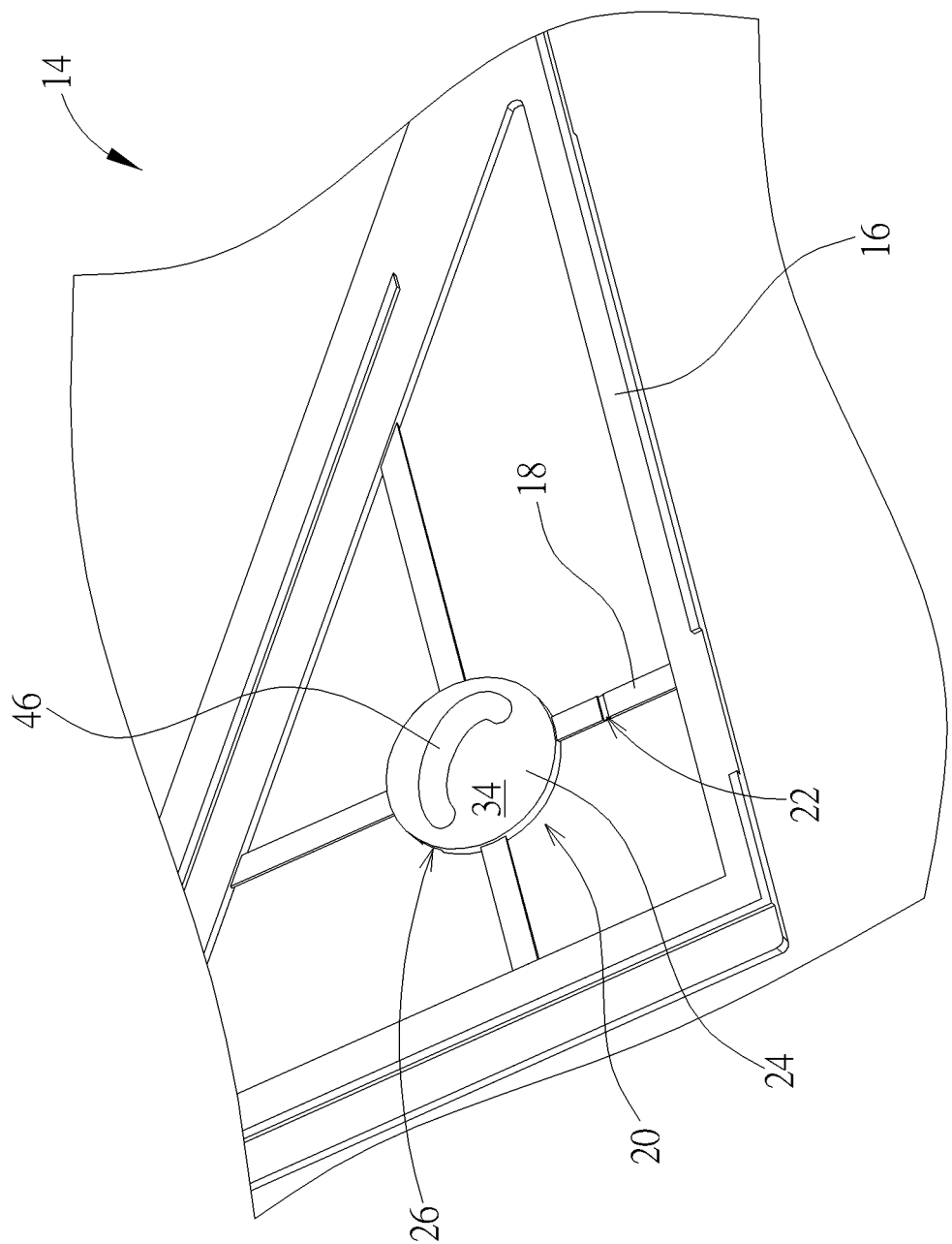
FIG. 10 is an enlarged diagram of the mechanical member according to a fifth embodiment of the present invention.

Please refer to FIG. 10. FIG. 10 is an enlarged diagram of the mechanical member 14 according to a fifth embodiment of the present invention. In the fifth embodiment, elements having the same numerals as ones of the foresaid embodiments have the same structures and functions, and the detailed description is omitted herein for simplicity. The inspection portion 20 of the mechanical member 14 can further include a ring unit 46 disposed on the top surface 34 of the inspection portion 20 for bearing the external force. The ring unit 46 can be a semicircle form, a triangular form, a rectangle form, or any possible form where through the solid component or the soft material passes. The external component can pass through or insert into the ring unit 46 and then pulled upwardly for testing.

In conclusion, the mechanical member of the present invention can dispose the inspection portion adjacent to the main structural portion, and the inspection portion is applied for the destructive test to protect the initial function of the main structural portion. For decreasing manufacturing cost of the mechanical member, the present invention can connect the bridging portion between the main structural portion and the inspection portion, and manufacture the main structural portion, the bridging portion and the inspection portion of the mechanical member in the same injection molding manner, and then attach the main structural portion and the inspection portion to the housing in the same adhesive manner. When the mechanical member is attached to the housing, the destructive test for the inspection portion can be executed by cutting off the bridging portion to break down connection between the main structural portion and the inspection portion. Because the main structural portion and the inspection portion can have the same adhesion strength relative to the housing, the testing result of the inspection portion can be used to evaluate whether the adhesion strength of the main structural portion conforms to a predefined condition, and completeness of the main structural portion can be stilled maintained without discarding the mechanical member.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A mechanical member of testing adhesion strength and being assembled with a housing, the mechanical member comprising:
   a main structural portion attached to the housing;
   a bridging portion connected to the main structural portion and having a cuttable property; and an inspection portion connected to a position of the bridging portion different from the main structural portion, and further attached to the housing, the inspection portion being pulled or pushed by an external force when the bridging portion is cut off, so as to evaluate adhesion strength between the main structural portion and the housing according to a separation degree between the inspection portion and the housing;

wherein the inspection portion comprises a plate structure, a bottom surface of the plate structure is attached to the housing, and a long ditch is formed on the bottom surface.

2. The mechanical member of claim 1, wherein the bridging portion contacts against the housing in a coherent manner or in an incoherent manner, or the bridging portion is spaced from the housing.

3. The mechanical member of claim 1, wherein the bridging portion comprises a first end and a second end opposite to each other, the first end and the second end are respectively connected to the main structural portion and the inspection portion, the bridging portion is cut off at an area between the first end and the second end, or at an area between the first end and the main structural portion, or at an area between the second end and the inspection portion.

4. The mechanical member of claim 1, wherein the bridging portion comprises a notch used to weaken structural strength of the bridging portion for easily cut-off.

5. The mechanical member of claim 4, wherein the notch is a slot, or a concave, or a hole.

6. The mechanical member of claim 1, wherein the inspection portion further comprises a piercing hole formed on a position of the plate structure corresponding to the long ditch.

7. The mechanical member of claim 1, wherein the inspection portion further comprises a locking unit, a sunken area of the locking unit is used to hold an external component for bearing the external force.

8. The mechanical member of claim 7, wherein the locking unit is disposed on a central area or an edge area of a top surface of the inspection portion.

9. The mechanical member of claim 1, wherein the inspection portion further comprises a bucking unit, an outer surface of the bucking unit is connected to an external component for bearing the external force.

10. The mechanical member of claim 9, wherein the bucking unit comprises a first region and a second region, the first region is disposed on a top surface of the inspection portion, the second region is disposed on an end of the first region opposite to the top surface, and a radial dimension of the second region is greater than a radial dimension of the first region.

11. The mechanical member of claim 9, wherein the bucking unit is disposed on a central area or an edge area of the top surface.

12. The mechanical member of claim 1, wherein the inspection portion further comprises a ring unit disposed on a top surface of the inspection portion for bearing the external force.

13. The mechanical member of claim 1, wherein the mechanical member is made by plastic material, the housing is a case of an electronic device made by metal material or fiberglass material.

14. The mechanical member of claim 13, wherein the main structural portion, the bridging portion and the inspection portion of the mechanical member are monolithically integrated in an injection molding manner.

* * * * *